United States Patent
Miyazawa (10) Patent No.: US 10,389,942 B2
(45) Date of Patent: Aug. 20, 2019

(54) IMAGE BLUR CORRECTION APPARATUS, CONTROL METHOD THEREOF, AND IMAGING APPARATUS

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/053,931

(22) Filed: Aug. 3, 2018

(65) Prior Publication Data

US 2019/0052809 A1    Feb. 14, 2019

(30) Foreign Application Priority Data

Aug. 14, 2017 (JP) ................. 2017-156587

(51) Int. Cl.
*H04N 5/232* (2006.01)
*G06T 5/00* (2006.01)
*G06T 7/70* (2017.01)
*G06T 7/20* (2017.01)
*G01P 3/68* (2006.01)

(52) U.S. Cl.
CPC ......... *H04N 5/23267* (2013.01); *G06T 5/003* (2013.01); *G06T 7/20* (2013.01); *G06T 7/70* (2017.01); *G01P 3/68* (2013.01)

(58) Field of Classification Search
None
See application file for complete search history.

(56) References Cited

U.S. PATENT DOCUMENTS

2017/0155842 A1\* 6/2017 Takayanagi ............. G06T 5/003

FOREIGN PATENT DOCUMENTS

JP        2006-317848 A    11/2006

\* cited by examiner

*Primary Examiner* — Mark T Monk
(74) *Attorney, Agent, or Firm* — Cowan, Liebowitz & Latman, P.C.

(57) ABSTRACT

An imaging apparatus includes an angular velocity sensor configured to detect shaking and a motion vector detection unit configured to detect movement in a captured image. A shift lens group constitutes a correction optical system configured to correct an image blur due to shaking exerted on the imaging apparatus. A position sensor detects a position of the shift lens group. A distance acquiring unit acquires distance information associated with the captured image. When an angular velocity of an object is calculated on the basis of a shaking detection signal, a movement vector, position information of the shift lens group, and the distance information, an object angular velocity calculating unit calculates an amount of movement of the object by adding position information of the shift lens group synchronized with a detection period of the movement vector to movement vector information and calculates an amount of shaking correction.

18 Claims, 9 Drawing Sheets

IMAGE BLUR CORRECTION APPARATUS, CONTROL METHOD THEREOF, AND IMAGING APPARATUS

BACKGROUND OF THE INVENTION

Field of the Invention

The present invention relates to a technique for correcting an image blur due to an imaging apparatus or an optical apparatus.

Description of the Related Art

Panning is a method of setting a shutter speed so that a constant amount of shaking (hereinafter referred to as an "amount of background flowing") is obtained on an imaging element to express a lively motion of an object and performing photographing while causing a camera to follow an object in accordance with movement of the object. The first reason why panning is regarded as a difficult photographing technique is because it is difficult to perform photographing while causing a camera to follow movement of an object so that a deviation of the camera in a photographing direction with respect to the movement of the object is not generated. When a deviation of the camera in a photographing direction with respect to movement of an object is generated, the deviation is reflected in a photographed image as object shaking. The second reason is that people who are unfamiliar with panning do not know an optimum setting value for a shutter speed. For example, a first photographing scene in which panning is performed with a focal length of 50 mm with respect to a train moving at 60 km/h and a second photographing scene in which panning is performed with a focal length of 400 [mm] with respect to a racing car moving at 250 km/h may be assumed. Since shutter speeds when the same amount of background flowing is to be obtained differ between the first photographing scene and the second photographing scene, successful panning is not easy for a photographer without experience and skills.

Thus, a function for allowing a beginner to be able to simply perform panning (hereinafter referred to as a "panning assist function") has been suggested. A first panning assist function (hereinafter referred to as a "first assist function") is a function for detecting a deviation of a camera in a photographing direction with respect to movement of a main object and correcting object shaking according to the deviation using a correction optical system. With regard to the first assist function, Japanese Patent Laid-Open No. 2006-317848 describes an imaging apparatus configured to detect a difference between an object speed and a moving speed of a camera and correct an amount of deviation corresponding to the difference using a camera shake correction function.

In the apparatus described in Japanese Patent Laid-Open No. 2006-317848, object shaking is detected using a movement vector of a captured image and an angular velocity. Since a lens position of a correction optical system is not taken into consideration when detecting the object shaking, a movement vector of an object is likely to be unable to be accurately detected when the correction optical system is driven.

SUMMARY OF THE INVENTION

The present invention accurately detects movement of an object while driving a correction unit configured to optically correct an image blur.

An apparatus according to an embodiment of the present invention is an image blur correction apparatus which optically corrects an image blur of an object in an image captured by an imaging unit through an imaging optical system using a correction unit, including: a memory; at least one processor configured to perform a following function in accordance with a program stored in the memory; a first acquiring unit configured to acquire distance information associated with the captured image; a second acquiring unit configured to acquire position information of the correction unit; a calculating unit configured to calculate an amount of movement of the object from a detection signal of shaking detected by a first detection unit, movement information in an image detected by a second detection unit, the distance information, and the position information; and a control unit configured to calculate an amount of correction for the image blur of the object using the amount of movement of the object to control the correction unit. The calculating unit calculates the amount of movement of the object by adding the position information synchronized with a detection period of the second detection unit to the movement information.

Further features of the present invention will become apparent from the following description of exemplary embodiments with reference to the attached drawings.

DESCRIPTION OF THE EMBODIMENTS

Figure 1:
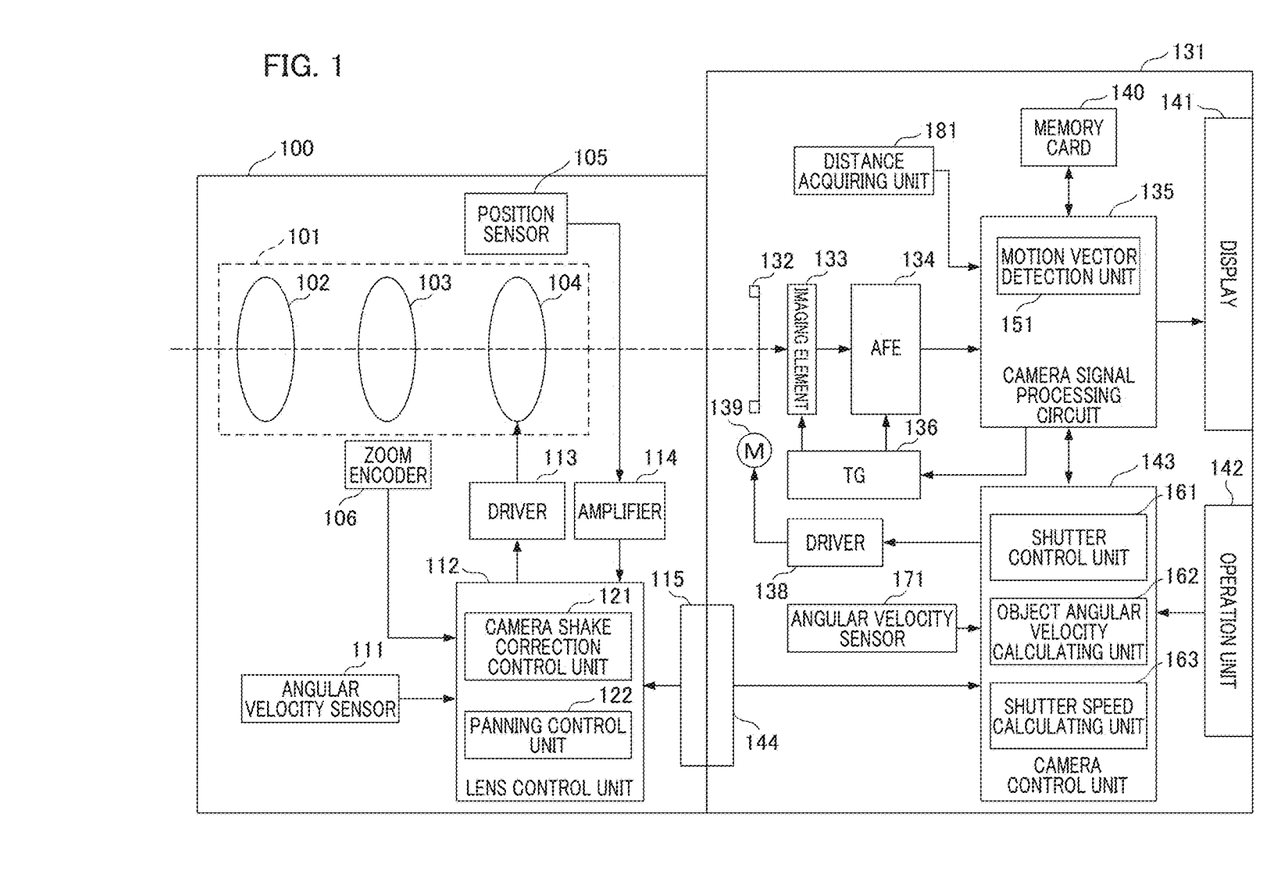
FIG. 1 is a diagram illustrating an example of a configuration of an imaging apparatus according to an embodiment.

An embodiment according to the present invention will be described below with reference to the drawings. FIG. 1 is a diagram illustrating an example of a configuration of an imaging apparatus according to the embodiment. As an example of an imaging system in which an interchangeable lens 100 can be attached to a camera main body 131, a digital camera having a panning assist function for supporting panning will be described. A control mode when panning assist is set refers to a "panning assist mode." The imaging apparatus has first and second assist functions in the panning assist mode. As described above, a first assist function is a function of detecting a deviation of a camera in a photographing direction with respect to movement of a main object and correcting object shaking according to the deviation using a correction optical system. A second assist function (second panning assist function) is a function in which a camera automatically sets a shutter speed in accordance with a photographing scene.

The interchangeable lens 100 includes a photographing lens unit 101. The photographing lens unit 101 includes a main imaging optical system 102, a zoom lens group 103, and a shift lens group 104. The zoom lens group 103 is an optical member whose focal length can be changed. The shift lens group (hereinafter simply also referred to as a "shift lens") 104 is a movable lens for correcting an image blur. The shift lens group 104 functions as a correction lens configured to correct an image blur by changing an imaging position of light from an object. Image shaking with respect to an optical axis due to shaking of the imaging apparatus can be optically corrected by moving a shift lens in a direction which is perpendicular to an optical axis of the photographing lens unit 101.

The interchangeable lens 100 includes a zoom encoder 106, a position sensor 105, and an angular velocity sensor 111. The zoom encoder 106 detects a position of the zoom lens group 103. The position sensor 105 detects a position of the shift lens group 104. The angular velocity sensor 111 is an example of a shaking detection means for detecting shaking of the imaging apparatus and outputs a shaking detection signal.

A lens control unit 112 includes a microcomputer for controlling a lens system. The lens control unit 112 controls driving of the shift lens group 104 via a driver 113. An amplifier 114 amplifies an output of the position sensor 105 and outputs a position detection signal of the shift lens to the lens control unit 112.

The interchangeable lens 100 has a mount contact portion 115 and is connected to a mount contact portion 144 of the camera main body 131. The lens control unit 112 includes first and second control units. The first control unit is a camera shake correction control unit 121 configured to perform camera shake correction control. The second control unit is a panning control unit 122 configured to perform control for panning assist. In addition to that, the lens control unit 112 also performs focus adjustment control by movement of a focus lens, aperture control, and the like, which is omitted for simplicity in the drawing. In camera shake correction by the camera shake correction control unit 121, detection and correction for shaking are performed with respect to two axes which are orthogonal to each other, for example, a horizontal direction and a vertical direction, but explanation corresponding to only one axis will be provided because the two axes have the same configuration. As described above, the imaging apparatus according to the embodiment includes an image blur correction apparatus which corrects an image blur by moving an optical element (shift lens) in a direction which is orthogonal to an optical axis.

The camera main body 131 includes a shutter 132 configured to control an exposure time. An imaging element 133 is, for example, a complementary metal oxide semiconductor (CMOS) type image sensor or the like, receives light from an object whose image is formed through an imaging optical system, performs photoelectric conversion on the light, and outputs a photoelectrically converted electrical signal. An analog signal processing circuit (AFE) 134 processes an output signal of the imaging element 133 and supplies the signal to a camera signal processing circuit 135.

The camera signal processing circuit 135 includes a motion vector detection unit 151. The motion vector detection unit 151 detects movement of an object from a plurality of images having different imaging times on the basis of the output signal of the imaging element 133. Furthermore, the camera signal processing circuit 135 processes the output signal of the imaging element 133, outputs a signal for recording to a memory card 140, and outputs a signal for display to a display 141. A timing generator (TG) 136 sets operation timings for the imaging element 133 and the analog signal processing circuit 134. An operation unit 142 includes a power switch, a release switch, a switching switch, and the like. A user can operate the switching switch to set a mode to the panning assist mode.

A camera control unit 143 includes a microcomputer for controlling a camera system and controls constituent sections of the imaging system. The camera control unit 143 includes a shutter control unit 161, an object angular velocity calculating unit 162, and a shutter speed calculating unit 163. The shutter control unit 161 controls a shutter drive motor 139 via a driver 138 and controls an operation of the shutter 132. The object angular velocity calculating unit 162 calculates an angular velocity of the main object. The shutter speed calculating unit 163 calculates a shutter speed when the panning assist mode is set.

The memory card 140 is a recording medium configured to recording a signal of a photographed image. The display 141 includes a display device such as a liquid crystal panel (liquid crystal display (LCD)). The display 141 displays an image of an object the user attempts to photograph with the camera on a monitor and displays a photographed image on a screen.

The camera main body 131 has the mount contact portion 144 with the interchangeable lens 100. The lens control unit 112 and the camera control unit 143 perform serial communication via the mount contact portions 115 and 144 at a predetermined timing. An angular velocity sensor 171 detects shaking of the camera main body 131 and outputs a shaking detection signal to the camera control unit 143. A distance acquiring unit 181 acquires distance information associated with a captured image and outputs the acquired distance information to the camera signal processing circuit 135.

In the imaging system in FIG. 1, when the user operates the power switch of the operation unit 142 and thus power to the camera is on, the camera control unit 143 detects the state change. The camera control unit 143 performs power supply and initial setting for each circuit of the camera main body 131. Furthermore, power is supplied to the interchangeable lens 100 and the lens control unit 112 performs initial setting in the interchangeable lens 100. After the camera control unit 143 and the lens control unit 112 are brought into a communicative state, communication is started between these units at a predetermined timing. In communication from the camera control unit 143 to the lens control unit 112, a camera state, photographing settings information, and the like are transmitted. Furthermore, in communication from the lens control unit 112 to the camera control unit 143, focal distance information, angular velocity information, and the like of the interchangeable lens 100 are transmitted.

The user can change a mode from a normal mode to the panning assist mode by operating the switching switch of the operation unit 142. The normal mode is a mode in which the panning assist mode is not set. When the normal mode is selected, the angular velocity sensor 111 detects shaking exerted on the camera by hand shaking or the like in the interchangeable lens 100. The camera shake correction control unit 121 controls driving of the shift lens group 104 using a detection signal from the angular velocity sensor 111. Thus, a camera shake correction operation is performed and image blur in a captured image is reduced.

Figure 2:
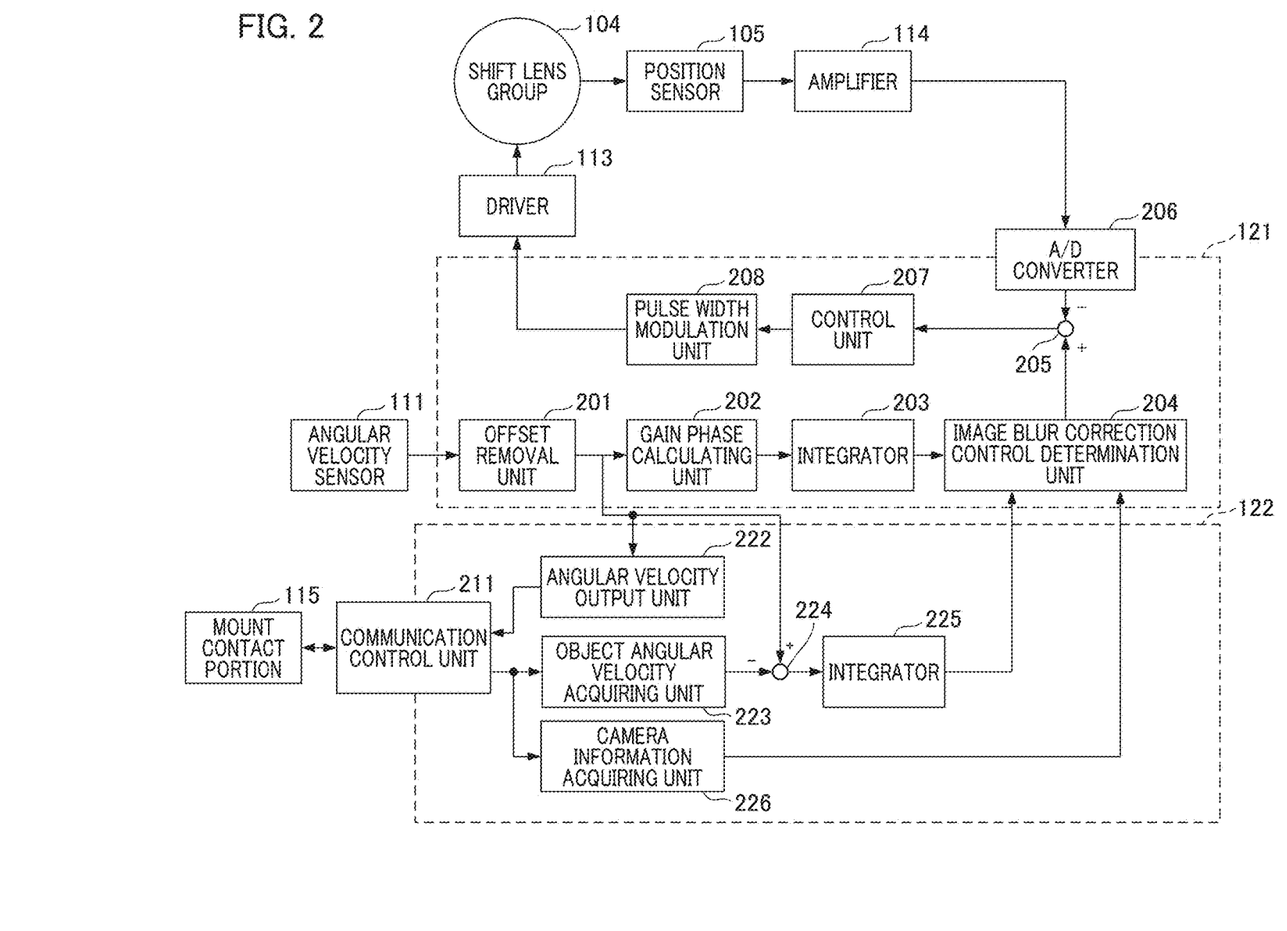
FIG. 2 is a control block diagram of a correction optical system according to the embodiment.

A camera shake correction function will be described with reference to FIG. 2. FIG. 2 is a diagram showing a configuration associated with a camera shake correction operation and a panning assist operation. Constituent elements which are the same as those in FIG. 1 are denoted with previously used reference numerals and detailed description thereof will be omitted.

The camera shake correction control unit 121 includes an offset removal unit 201 and removes an offset included in an angular velocity detection signal from the angular velocity sensor 111. The offset removal unit 201 removes a direct current (DC) component included in an output of the angular velocity sensor 111 using, for example, a filter arithmetic unit constituted of a high pass filter (HPF) or the like. A gain phase calculating unit 202 acquires an output of the offset removal unit 201 and performs amplification and phase compensation. The gain phase calculating unit 202 is constituted of an amplifier configured to amplify an angular velocity signal from which an offset component has been removed with a predetermined gain and a phase compensation filter An integrator 203 integrates an output of the gain phase calculating unit 202. The integrator 203 has a function capable of changing characteristics to an arbitrary frequency band and calculates an amount of driving of the shift lens group 104.

The camera shake correction control unit 121 performs a determination process for panning (or tilting) of the imaging apparatus. For example, when an angular velocity indicated by a detection signal of the angular velocity sensor 111 has a magnitude equal to or larger than a predetermined threshold value and a predetermined time (threshold value time for determination) has elapsed, it may be determined that a panning operation is in progress. In this case, a process in which a cutoff frequency of the HPF in the offset removal unit 201 is gradually changed toward a higher frequency is performed. Control is performed so that the shift lens is returned to an optical center position by gradually changing the cutoff frequency toward a higher frequency and gradually reducing a target signal of the camera shake correction control. When this control is not performed, camera shake correction is performed using an angular velocity detection signal of significant shaking of an extent that the shaking is determined to be a panning operation. As a result, the shift lens is likely to reach a correction limit point (a limit position in a control range) and an unnatural change in angle of view is likely to be seen by a photographer on the screen. Occurrence of this phenomenon can be prevented by performing a process of gradually changing the cutoff frequency of the HPF toward a higher frequency.

An image blur correction control determination unit (hereinafter referred to as a "control determination unit") 204 acquires outputs of an integrator 225 which will be described later and the integrator 203 and switches a signal for driving the shift lens in accordance with an output of a camera information acquiring unit 226 as follows.

(1) When a photographing mode is set to the panning assist mode, the control determination unit 204 selects an output of the integrator 225 calculated by the panning control unit 122.

(2) When the photographing mode is set to a mode other than the panning assist mode,
the control determination unit 204 selects an output of the integrator 203 calculated by the camera shake correction control unit 121.

It should be noted that the integrator 225 and the camera information acquiring unit 226 in the panning control unit 122 will be described later.

The position sensor 105 detects a position of the shift lens group 104 and the amplifier 114 amplifies a position detection signal. An analog/digital (A/D) converter 206 digitizes the position detection signal amplified by the amplifier 114 and outputs the digitized signal to a subtracter 205. The subtracter 205 performs subtraction using an output of the control determination unit 204 as a positive input and an output of the A/D converter 206 as a negative input and outputs deviation data which is a subtraction result to a control unit 207. The control unit 207 includes an amplifier configured to amplify deviation data output by the subtracter 205 with a predetermined gain and a phase compensation filter. The deviation data is processed by the amplifier and the phase compensation filter in the control unit 207 and then is output to a pulse width modulation unit 208. The pulse width modulation unit 208 acquires output data of the control unit 207, modulates the output data into a waveform (that is, a pulse width modulated (PWM) waveform) due to which a duty ratio of a pulse wave is changed, and outputs the waveform to the driver 113 for driving the shift lens. A voice coil type motor is used for driving the shift lens group 104 and the driver 113 moves the shift lens group 104 in a direction which is perpendicular to an optical axis of the imaging optical system in accordance with an output of the pulse width modulation unit 208.

Next, the first assist function in the panning assist mode will be described.

The panning control unit 122 will be described with reference to FIGS. 1 and 2. When the user operates the operation unit 142 to set the panning assist mode, the camera control unit 143 performs switching to panning assist control. Furthermore, information indicating the switching is transmitted from the camera control unit 143 to the lens control unit 112 and the lens control unit 112 performs switching to panning assist control. The camera information acquiring unit 226 (FIG. 2) acquires various kinds of pieces of camera information transmitted from the camera control unit 143 via a communication control unit 211. The camera information is settings information, release information, and the like in the panning assist mode. The camera information acquiring unit 226 outputs information required for a determination process to the control determination unit 204.

An angular velocity output unit 222 acquires an output of the offset removal unit 201, that is, an angular velocity detection signal of the angular velocity sensor 111 from which an offset component has been removed. The angular velocity output unit 222 transmits the angular velocity detection signal to the camera control unit 143 via the communication control unit 211 and the mount contact portion 115. An object angular velocity acquiring unit 223 acquires angular velocity data of an object calculated by the object angular velocity calculating unit 162 in the camera main body 131 via the mount contact portions 144 and 115 and the communication control unit 211. A subtracter 224 performs subtraction using an output of the offset removal unit 201 as a positive input and an output of the object angular velocity acquiring unit 223 as a negative input. A deviation is calculated by subtracting an angular velocity indicated by a detection signal from which an offset component has been removed from an angular velocity of an object from the object angular velocity acquiring unit 223. The subtracter 224 outputs the deviation to the integrator 225. The integrator 225 integrates the deviation and outputs a result of the integration operation to the control determination unit 204.

In the process of calculating the angular velocity of the object performed by the object angular velocity calculating unit 162, amounts of movement in an image are detected as vectors and a process in which only a vector corresponding to the object (object vector) is accurately detected in all of the detected vectors is performed. A process of converting the detected object vector into an angular velocity (object angular velocity) is performed.

Figure 3:
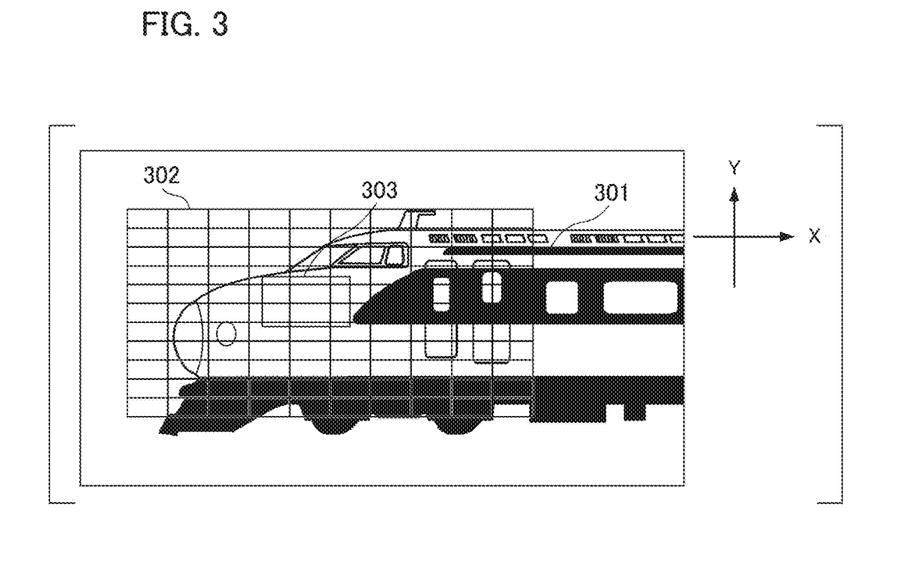
FIG. 3 is an explanatory diagram of motion vector detection at the time of panning.

Here, a method for accurately detecting an object vector will he described. In the camera main body 131, the motion vector detection unit 151 in the camera signal processing circuit 135 detects a movement vector during a panning assist operation. In other words, a movement vector of an image is detected in a plurality of pieces of video information signal-processed by the analog signal processing circuit 134. A specific example will be described with reference to FIG. 3. FIG. 3 illustrates an example of a photographing scene of an object 301 which is a moving body, a horizontal direction of a photographing screen being defined as an X direction, and a vertical direction thereof being defined as a Y direction. In this case, two types of vector detected by the motion vector detection unit 151 are a vector corresponding to a portion of the object 301 and a vector corresponding to a background portion. A rectangular frame corresponding to a plurality of detection blocks is a detection frame 302 for detecting a movement vector. A focus frame (focus detection frame) 303 for focusing on an object is indicated by a rectangular frame.

The settings in FIG. 3 are provided to have a dense arrangement to correct only object shaking in panning by the correction optical system. In other words, the detection accuracy for each detection block corresponding to the detection frame 302 can be increased by providing settings to have a dense arrangement.

Figure 4A:
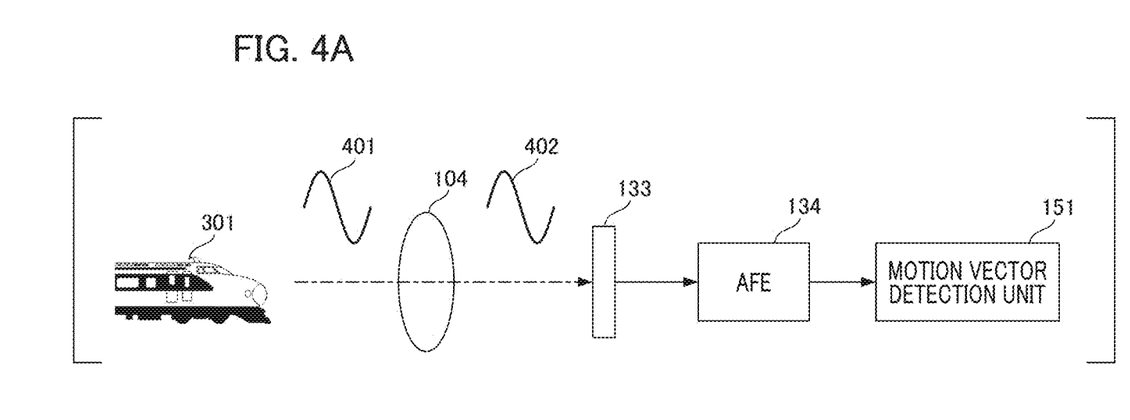
FIGS. 4A and 4B are diagram for explaining a driving state and motion vector detection in the correction optical system.
Figure 4B:
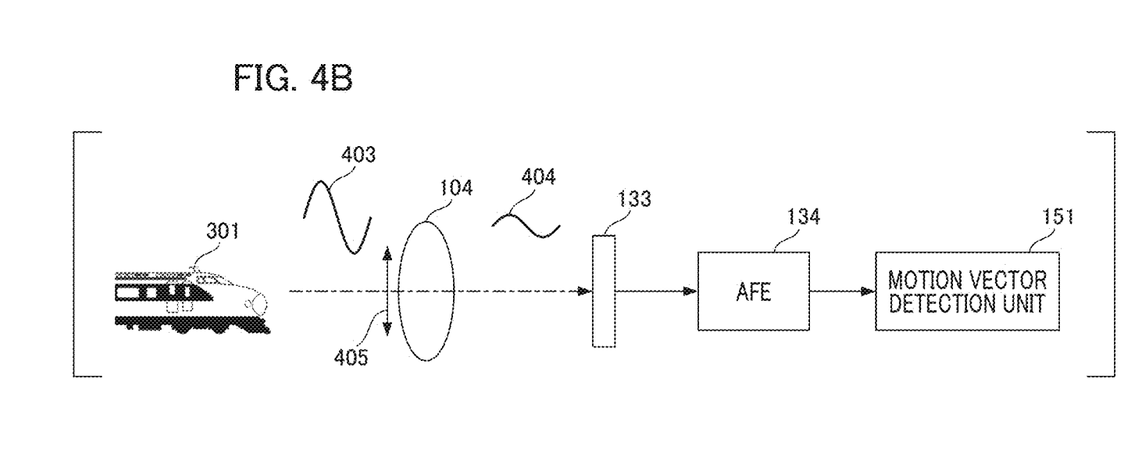

The reason why an output of the position sensor 105 of the shift lens group 104 is used for detecting an object vector will be described with reference to FIGS. 4A and 4B. FIG. 4A is an explanatory diagram when the shift lens group 104 is not driven. When a camera shake correction setting before exposure is off, the shift lens group 104 is not driven. FIG. 4B is an explanatory diagram when the shift lens group 104 is driven. When a camera shake correction setting before exposure is on, the shift lens group 104 is driven.

In FIG. 4A, the object 301 which is an object in an image whose movement is stopped by panning is a moving body. An object image 401 is formed on the imaging element 133 via an imaging optical system including the shift lens group 104. The output signal of the imaging element 133 is processed by the analog signal processing circuit (AFE) 134 and the motion vector detection unit 151 detects a movement vector of the object 301. As illustrated in FIG. 4A, when the shift lens group 104 is not driven, an object image 402 formed on the imaging element 133 is equivalent to the previous object image 401 which does not involve the shift lens group 104.

On the other hand, in the state illustrated in FIG. 4B, the shift lens group 104 is driven before exposure. In this case, an optical image formed on the imaging element 133 is not the original object image 403 and is an object image 404 when an amount of movement corresponding to an amount of driving 405 of the shift lens group 104 is subtracted from the amount of movement thereof. In other words, when the shift lens group 104 is driven at the time of panning, the motion vector detection unit 151 cannot detect movement of the object image 403 intended to be corrected. Thus, in the embodiment, the original amount of movement of the object image 403 is calculated by adding an amount of movement corresponding to the amount of driving 405 of the shift lens group 104 to an amount of movement of an image 402 detected by the motion vector detection unit 151. To be specific, a process of integrating an output of the position sensor 105 of the shift lens is performed at a time synchronized with an exposure priority period in which the motion vector detection unit 151 performs detection. An output value of the motion vector detection unit 151 is in units of pixels. For this reason, in an integrated output value of the position sensor 105, conversion from an angle unit to a pixel unit is performed using a focal length or a frame rate.

Figure 5:
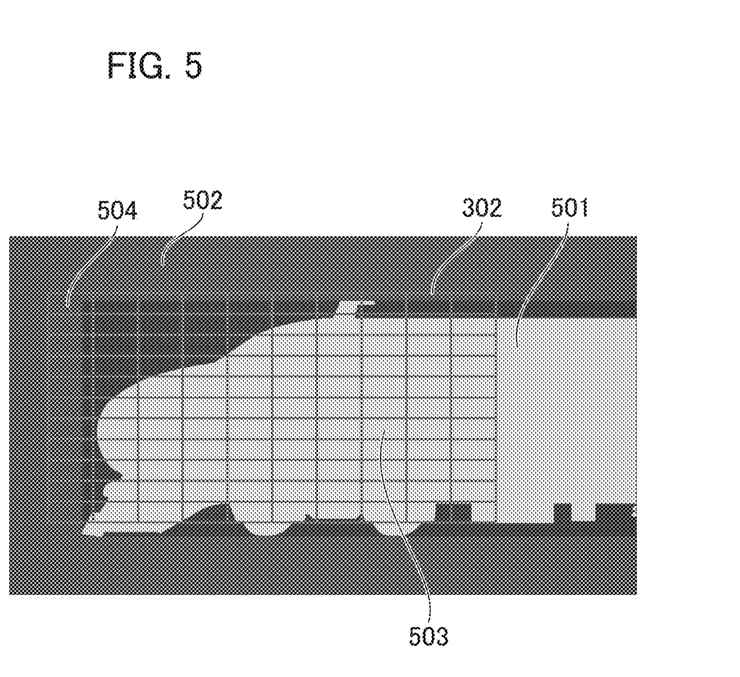
FIG. 5 is an explanatory diagram of distance information in the embodiment.

A relationship between distance information of an image from the distance acquiring unit 181 and a movement vector from the motion vector detection unit 151 will be described below with reference to FIG. 5. Distance information (depth information) of an object in a photographed image is information indicating a distance relationship between the imaging apparatus and the object in a depth direction. The distance information from the distance acquiring unit 181 can be broadly classified into two types and is a distance 501 in a nearest distance direction and a distance 502 in an infinite distance direction (direction of infinity). FIG. 5 illustrates an example of a distance imp corresponding to the image in FIG. 3. The distance 501 in the nearest distance direction is a distance from a camera position to an object in the vicinity of the camera and is distance information (short distance information) of an object portion which corresponds to the focus frame. The distance 502 in the infinite distance direction is a distance from the camera position to an object in the vicinity of the background and is distance information (long distance information) of a background portion which does not correspond to the focus frame.

There are the following methods as methods for acquiring distance information.

Method Using Autofocus Sensor (AF Sensor)

The distance acquiring unit 181 acquires distance information using an AF sensor for detecting a phase difference. In this case, the imaging apparatus includes an AF-dedicated detection unit, which detects a phase difference of an image signal and can acquire an amount of image deviation, an amount of defocus, and the like as distance information.

Method Using Evaluation Value for AF for Contrast Method

The distance acquiring unit 181 acquires an evaluation value for autofocus by contrast detection in an image signal from the imaging element 133 and acquires distance information using the evaluation value.

Method Using Imaging Element Having Image Plane Phase Difference Type Function

A pair of image signals are obtained by dividing incident light passing through a photographing lens into light in two directions using a pupil division type imaging element having an image plane phase difference detection function. In other words, a photoelectric conversion unit of an imaging element receives light passing through different pupil partial regions of the imaging optical system. The distance acquiring unit 181 acquires an amount of image deviation, an amount of defocus, and the like as distance information from a phase difference between a pair of image signals after photoelectric conversion.

Method for Acquiring Value of Distance Information set by Photographer

In a configuration in which a setting unit configured such that the photographer manually sets a distance to an object using the setting unit before photographing is provided, the distance acquiring unit 181 acquires a value set by the setting unit as distance information.

The camera signal processing circuit 135 weights distance information corresponding to each detection block in the detection frame 302 of FIG. 5 on the basis of the distance information acquired from the distance acquiring unit 181. For example, weighting processing may be performed so that distance information of a detection block 504 corresponding to a background portion is set to 30 m and distance information of a detection block 503 corresponding to an object portion is set to 10 m.

Figure 6A:
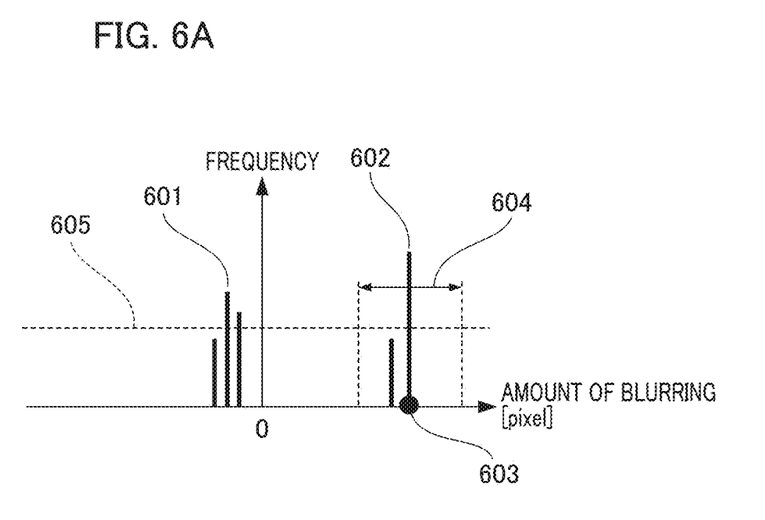
FIGS. 6A and 6B are explanatory diagrams of object vector detection in the embodiment.
Figure 6B:
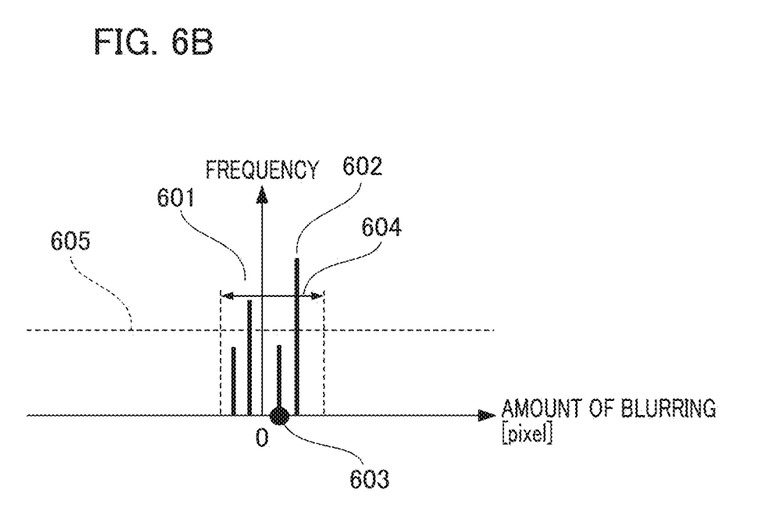

Detection of an object vector will be described with reference to FIGS. 6A and 6B. FIGS. 6A and 6B illustrate the result of histogram (frequency distribution) calculation of a movement vector detected by the motion vector detection unit 151. Horizontal axes indicate amounts of blurring (unit: pixels) and correspond to movement vectors. Vertical axes indicate frequencies of movement vectors. FIG. 6A shows a histogram for a direction in which the user shakes the camera at a constant angular velocity or more. A histogram in the horizontal direction (X direction) in FIG. 3 is exemplified. In the example of the photographing scene in FIG. 3, vectors detected by the motion vector detection unit 151 are broadly classified into two types of vector. There are a movement vector of an image corresponding to object shaking (a deviation between an object and the camera) and a movement vector of an image corresponding to background shaking.

The motion vector detection unit 151 detects movement of an image by comparing an image in a frame one frame ago with an image in a current frame at a set detection block position, but whether the movement of the image is movement of an object image or movement of a background image cannot be determined based only on the detection values. Thus, in the embodiment, an object vector corresponding to the object and a background vector corresponding to the background are separated from the detection values of the motion vector detection unit 151 using distance information of the image and an output of the angular velocity sensor. A process of detecting only an object vector will be described below.

FIG. 6A illustrates an example of an arrangement of a first group of vectors 601 located near zero and a second group of vectors 602 located near an amount of blurring 603. The amount of blurring 603 corresponds to angular velocity information which is an output of the angular velocity sensor 171, which is converted into an amount of movement in the imaging element 133. The second group of vectors 602 is a group of vectors present in a fixed range 604 centered on the amount of blurring 603. The fixed range 604 is a threshold value range for background determination. A frequency threshold value 605 is a threshold value for determining whether a vector is a valid vector. The camera control unit 143 determines a vector which is in the fixed range 604 centered on the amount of blurring 603 and whose frequency is equal to or higher than the threshold value 605 as a candidate for the background vector. In the example of FIG. 6A, a vector having a frequency equal to or higher than the threshold value 605 of the second group of vectors 602 is determined as a candidate for the background vector. Furthermore, the camera control unit 143 determines a vector which is present outside the range 604 and whose frequency is equal to or higher than the threshold value 605 as a candidate for the object vector. In the example of FIG. 6A, a vector having a frequency equal to or higher than the threshold value 605 of the first group of vectors 601 is determined as a candidate for the object vector.

In the embodiment, the threshold value range 604 for background determination is provided, for example, to prevent erroneous detection of the motion vector detection unit 151 due to variation of an output of the angular velocity sensor 171, variation of a focal length, or the like. The camera control unit 143 finally checks distance information of a candidate for the object vector and selects the detection block 503 (FIG. 5) closest to the focus frame 303 (FIG. 3) when information on the nearest distance side has been acquired. It should be noted that a process of integrating a certain number of object vectors around the detection block 503 closest to the focus frame 303 using the detection block 503 as an origin may be performed. Although an example in which the angular velocity sensor 171 in the camera main body 131 is used has been described in the embodiment, the angular velocity sensor 111 in the interchangeable lens 100 may be used. Alternatively, an embodiment in which the angular velocity sensors 111 and 171 are used together may be adopted.

On the other hand, FIG. 6B illustrates a histogram in a movement direction in which the user shakes the camera at a constant angular velocity or less or in a direction in which the camera is not moved. For example, a histogram in the vertical direction (Y direction) in FIG. 3 is exemplified. Settings in the horizontal axis and the vertical axis are the same as in FIG. 6A. FIG. 6B illustrates an example in which all vectors detected by the motion vector detection unit 151 are included in the threshold value range 604 for background determination because an angular velocity in shaking of the camera is very small. However, actually, minute object shaking can occur even in a direction other than a panning (or tilting) direction of the camera. In order to extract minute object shaking, the detection block 503 closest to the focus frame 303 is selected when distance information of the detection block 503 closest to the focus frame 303 has been acquired. It should be noted that a process of integrating a certain number of object vectors around the detection block 503 closest to the focus frame 303 using the detection block 503 as an origin may be performed.

The object vector is determined and then a process of calculating an object angular velocity is performed. An angular velocity [degrees/sec] can be calculated from an amount of image plane movement [pixels] by a process opposite to a process of converting the angular velocity [degrees/sec] into the amount of image plane movement [pixels] using a focal length, a frame rate, and a pixel pitch in an imaging element. The camera control unit 143 transmits a value obtained by adding angular velocity data from the angular velocity output unit 222 in the interchangeable lens 100 to an angular velocity of the object calculated by the object angular velocity calculating unit 162 to the lens control unit 112. The transmission information of the camera control unit 143 is received by the lens control unit 112 in the interchangeable lens 100 via the mount contact portions 144 and 115.

Next, the second assist function of the panning assist will be explained.

The shutter speed calculating unit 163 in the camera main body 131 calculates a shutter speed for the panning assist. Specifically, the shutter speed is calculated by Expression (1) using the following information:

$$TV = \alpha/f/(\omega c - \omega s) \tag{1},$$

in the above expression,

TV: a shutter speed,

α: a setting value for a flowing effect of a background set by the photographer using the operation unit 142, f: a focal length of the interchangeable lens 100 obtained via the mount contact portions 115 and 144, ωc: an angular velocity detected by the angular velocity sensor 171 in the camera main body 131, and ωs: an object angular velocity calculated by the object angular velocity calculating unit 162.

The setting value α of the flowing effect in the background is a value which is set in advance such that an amount of shaking in the background image is, for example, 800 μm (micrometers) in terms of an amount of movement on an image plane. With regard to the flowing effect in the background, a plurality of effects such as small, medium, and large can be set in a stepwise manner. The photographer merely sets the panning assist mode and sets the flowing effect in the background to a desired setting and thereby the camera control unit 143 automatically sets and controls a shutter speed in accordance with an angular velocity of shaking of the camera and a focal length. Thus, a photographer who is unfamiliar with panning can also easily set the shutter speed.

Figure 7:
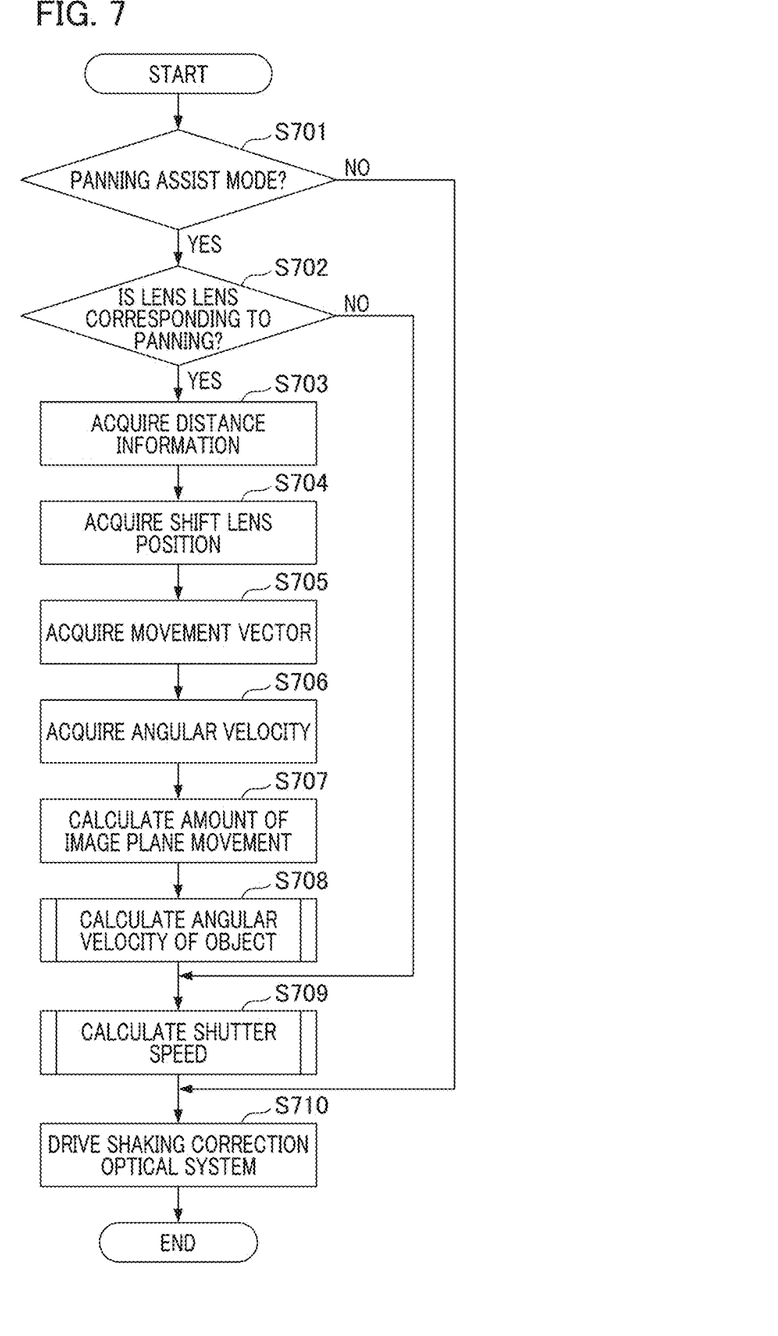
FIG. 7 is a flowchart showing the entire processing of panning assist in the embodiment.
Figure 8:
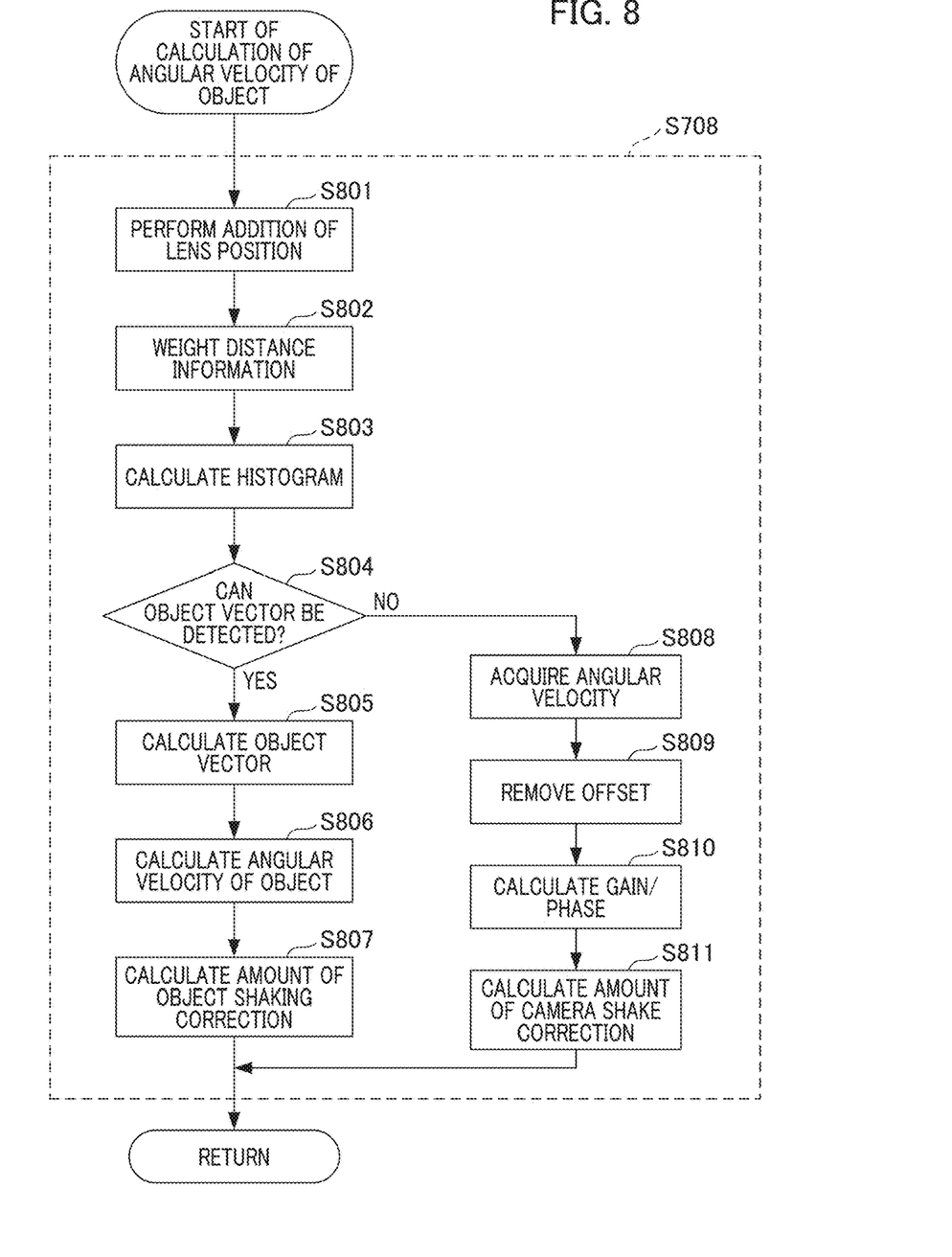
FIG. 8 is a flowchart of a first assist function in the embodiment.
Figure 9:
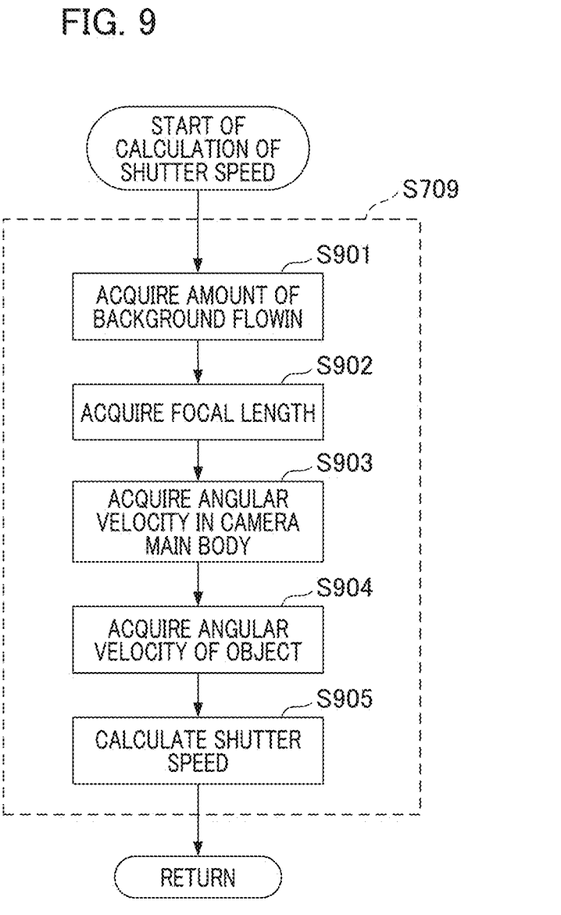
FIG. 9 is a flowchart of a second assist function in the embodiment.

Control of panning assist will be described with reference to flowcharts of FIGS. 7 to 9. FIG. 7 is the flowchart for describing a flow of an overall process associated with the control of the panning assist. The following process is realized when central processing units (CPUs) of the camera control unit 143 and the lens control unit 112 interpret and execute a predetermined control program.

(S701) Determination Process of Panning Assist Mode

The camera control unit 143 determines whether the photographer has performed a setting operation of the panning assist mode using the operation unit 142. When a mode is set to the panning assist mode, the process proceeds to the process of S702. In addition, when the mode is set to a mode other than the panning assist mode, the process ends without performing control of panning assist.

(S702) Determination Process of Interchangeable Lens 100

The camera control unit 143 determines whether the interchangeable lens 100 installed in the camera main body 131 is an interchangeable lens which corresponds to panning assist. If it is determined that the interchangeable lens 100 is an interchangeable lens which corresponds to the panning assist, the process proceeds to a process of S703. In addition, if it is determined that the interchangeable lens 100 is an interchangeable lens which does not correspond to the panning assist, the process proceeds to a process of S709. The determination process concerning whether the interchangeable lens 100 corresponds to the panning assist is performed on the basis of a signal of lens information transmitted from the lens control unit 112 to the camera control unit 143. When a lens communication function is not provided such as in a compact digital camera or the like, a condition determination process in S702 is not required and the process proceeds to the process of S703.

(S703) Acquisition of Distance Information

The distance acquiring unit 181 acquires distance information associated with a captured image. The motion vector detection unit 151 sets the detection frame 302 of a movement vector. Subsequently, the process proceeds to a process of S704.

(S704) Acquisition of Position Information of Shift Lens Group 104

Position information of the shift lens group 104 detected by the position sensor 105 is acquired. Here, the acquired position information of the shift lens group 104 is an average value of outputs of the position sensor 105 synchronized with a detection period of the motion vector detection unit 151. Subsequently, the process proceeds to a process of S705.

(S705) Acquisition of Movement Vector

The motion vector detection unit 151 detects a movement vector in the screen and then the process proceeds to a process of S706.

(S706) Acquisition of Angular Velocity

An angular velocity detection signal detected by the angular velocity sensor 111 is transmitted from the lens control unit 112 to the camera control unit 143. The camera control unit 143 acquires an angular velocity detection signal of shaking. Furthermore, an angular velocity detection signal is acquired by the angular velocity sensor 171 in the camera main body 131. A value of the angular velocity detection signal acquired in this step is an average value of outputs of the angular velocity sensor 111 synchronized with the detection period of the motion vector detection unit 151. Subsequently, the process proceeds to a process of S707.

(S707) Calculation of Amount of Image Plane Movement

The camera control unit 143 performs calculation for converting an angular velocity acquired in S706 into an amount of image plane movement. An amount of movement (amount of image plane movement) in an image plane is calculated using an angular velocity detected by the angular velocity sensor 111 in the interchangeable lens 100, a focal length of the imaging optical system, and a frame rate. Subsequently, the process proceeds to a process of S708.

(S708) Calculation of Angular Velocity of Object

The object angular velocity calculating unit 162 calculates an angular velocity of the main object from a main object vector determined using information acquired in S703 to S706. The calculation process will be described in detail later with reference to FIG. 8. Subsequently, the process proceeds to the process of S709.

(S709) Calculation of Shutter Speed

The shutter speed calculating unit 163 calculates a shutter speed for panning assist. The calculation process will be described in detail later with reference to FIG. 9. Subsequently, the process proceeds to a process of S710.

(S710) Driving of Shaking Correction Optical System

The lens control unit 112 receives each of the data of the object angular velocity calculated in S708 and the shutter speed for the panning assist calculated in S709 from the camera control unit 143 and determines an amount of control for driving the shift lens group 104 during an exposure period. The driver 113 drives the shift lens group 104 in accordance with the determined amount of control. A difference between an angular velocity at the time of a panning operation of the camera and an angular velocity of the main object is reduced by an image blur correction optical system such that a probability of successful panning can be increased. Subsequently, the process illustrated in FIG. 7 ends.

The calculation of the object angular velocity in S708 in FIG. 7 will be described below with reference to the flowchart in FIG. 8.

(S801) Addition of Lens Position

The camera control unit 143 performs a process of adding a value regarding position information of the shift lens group 104 acquired in S704 in FIG. 7 to a detection value of the motion vector detection unit 151. Thus, the original image with object shaking can be obtained even when the shift lens group 104 is driven by camera shake correction control while a movement vector is being detected. Subsequently, the process proceeds to a process of S802.

(S802) Weighting of Distance Information

Weighting processing of distance information corresponding to each detection block detected by the motion vector detection unit 151 is performed on the basis of distance information (distance map) in the screen acquired in S703 in FIG. 7. Subsequently, the process proceeds to a process of S803.

(S803) Generation of Histogram

The camera control unit 143 performs histogram calculation based on the movement vector detected in S705 in FIG. 7. The histogram is generated and then the process proceeds to a process of S804.

(S804) Determination of Detection of Object Vector

The camera control unit 143 determines whether an object vector has been detected on the basis of a detection result of the motion vector detection unit 151. If it is determined that an object vector has been detected, the process proceeds to a process of S805. If it is determined that an object vector has not been detected, the process proceeds to a process of S808.

(S805) Calculation of Object Vector

The camera control unit 143 selects an object vector to be used Finally from object vector candidates. For example, when an object vector is detected by the detection block 503 (FIG. 5) closest to the position of the focus frame 303 (FIG. 3) and distance information thereof has been acquired, that detection block 503 is selected. The object vector is calculated and then the process proceeds to a process of S806.

(S806) Calculation of Object Angular Velocity

The object angular velocity calculating unit 162 calculates an angular velocity of an object. In other words, a process of calculating an object angular velocity from an amount of image plane movement of the object by a method opposite to the method for calculating the amount of image plane movement from the angular velocity in S707 in FIG. 7 is performed. Subsequently, the process proceeds to a process of S807.

(S807) Calculation of Amount of Object Shaking Correction

The camera control unit 143 adds a value of the angular velocity transmitted from the angular velocity output unit 222 to the camera control unit 143 to the object angular velocity calculated in S806 and transmits the result of addition to the lens control unit 112. The object angular velocity acquiring unit 223 acquires the object angular velocity transmitted from the camera control unit 143 to the lens control unit 112 and outputs the acquired object angular velocity to the subtracter 224. The subtracter 224 calculates a difference between an angular velocity from the angular velocity sensor 111 in the interchangeable lens 100 and the object angular velocity. The integrator 225 integrates the calculated difference and outputs the integrated value to the control determination unit 204 as a target control value for shake correction control (amount of object shaking correction) of the object. Subsequently, the process transitions to a return process.

(S808) Acquisition of Angular Velocity

The process is switched from this step to the camera shake correction control and the camera shake correction control unit 121 performs control. The angular velocity detected by the angular velocity sensor 111 in the interchangeable lens 100 is acquired and then the process proceeds to a process of S809.

(S809) Removal of Offset

The offset removal unit 201 in FIG. 2 removes an offset component superimposed on the angular velocity acquired in S808. For example, a low frequency component included in an angular velocity may be cut off by a high pass filter using a high pass filter having a function capable of changing its characteristics to an arbitrary frequency band and then a signal in a high frequency band may be output. Subsequently, the process proceeds to a process of S810.

(S810) Calculation of Gain/Phase

The gain phase calculating unit 202 in FIG. 2 calculates a gain and a phase at the time of performing a filtering process on a angular velocity from which an offset is removed. Signal processing for an angular velocity detection signal is performed by a filter circuit constituted of an amplifier configured to perform amplification with a predetermined gain and a phase compensation filter and then the process proceeds to a process of S811.

(S811) Calculation of Amount of Camera Shake Correction

The integrator 203 in FIG. 2 integrates the angular velocity which is signal-processed by the filter circuit in S810. An angle value obtained by the integration is output to the control determination unit 204 as a target control value (amount of camera shake correction) of camera shake correction control. Subsequently, the process transitions to the return process.

The calculation of the shutter speed for panning illustrated in S709 in FIG. 7 will be described below with reference to the flowchart in FIG. 9.

(S901) Acquisition of Amount of Background Flowing

The camera control unit 143 acquires a setting value ($\alpha$) of a background flowing effect that the photographer set with a setting operation using the operation unit 142. Subsequently, the process proceeds to a process of S902.

(S902) Acquisition of Focal Length

The camera control unit 143 acquires information about the focal length transmitted from the lens control unit 112 via the mount contact portions 115 and 144. Subsequently, the process proceeds to a process of S903.

(S903) Acquisition of Angular Velocity in Camera Main Body

The camera control unit 143 acquires an angular velocity ($\omega c$) detected by the angular velocity sensor 171 in the camera main body 131 and then the process proceeds to a process of S904. It should be noted that the angular velocity of the angular velocity sensor 111 in the interchangeable lens 100 may be acquired instead of the detection signal of the angular velocity sensor 171.

(S904) Acquisition of Angular Velocity of Object

The object angular velocity ($\omega s$) calculated in S708 in FIG. 7 is acquired and the process proceeds to a process of S905.

(S905) Calculation of Shutter Speed

The shutter speed calculating unit 163 calculates a shutter speed (TV) for panning on the basis of Expression (1) using each of data acquired in S901 to S904. If it is determined that an interchangeable lens which does not correspond to the panning assist in S702 in FIG. 7 is installed in the camera main body 131, the angular velocity detected by the angular velocity sensor 111 cannot be acquired. In this case, the angular velocity of the background is calculated based on the background vector determined from the histogram in S803 in FIG. 8 and the shutter speed for panning is calculated. Alternatively, a shutter speed may be set using a value (for example, 1/60 seconds) programmed in advance by the shutter speed calculating unit 163. Alternatively, with regard to the setting of the shutter speed in the second assist function, a configuration in which the user can select an automatic setting or a manual setting using the operation unit 142 may be adopted. In other words, a photographer who is familiar with panning can manually arbitrarily set the shutter speed. Furthermore, a photographer who is unfamiliar with panning can select an automatic setting.

In the embodiment, an esthetically pleasing panning photo in which a background image flows and image blur of a main object is reduced using the first and second assist functions can be simply photographed. It should be noted that an esthetically pleasing panning photo in which a background image flows and image blur of a main object is reduced if only either one of the first or second assist functions is performed can be simply photographed and a configuration in which only either of the first and second assist functions can be performed may be adopted.

Although the preferred embodiment of the present invention has been described above using the imaging apparatus illustrated in FIG. 1, i.e., a so-called mirrorless camera, the present invention can also be widely applied to single lens reflex cameras, compact digital cameras, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156587, filed Aug. 14, 2017, which is hereby incorporated by reference wherein in its entirety.

What is claimed is:

1. An image blur correction apparatus which optically corrects an image blur of an object in an image captured by an imaging unit through an imaging optical system using a correction unit, comprising:
   a memory;
   at least one processor configured to perform a following function in accordance with a program stored in the memory;
   a first acquiring unit configured to acquire distance information associated with the captured image;
   a second acquiring unit configured to acquire position information of the correction unit:
   a calculating unit configured to calculate an amount of movement of the object from a detection signal of shaking detected by a first detection unit, movement information in an image detected by a second detection unit, the distance information, and the position information; and
   a control unit configured to calculate an amount of correction for the image blur of the object using the amount of movement of the object to control the correction unit,
   wherein the calculating unit calculates the amount of movement of the object by adding the position information synchronized with a detection period of the second detection unit and the movement information.

2. The image blur correction apparatus according to claim 1, wherein the first acquiring unit acquires the distance information using a detection signal from a phase difference detection unit for autofocus, an evaluation value of a contrast of an image signal from the imaging unit, or an image signal from an image plane phase difference type imaging element.

3. The image blur correction apparatus according to claim 1, wherein the first detection unit detects an angular velocity of shaking, and
   the second detection unit detects a movement vector from an image having a different imaging time.

4. The image blur correction apparatus according to claim 3, wherein the calculating unit adds an average value of pieces of position information from the second acquiring unit synchronized with a detection period of the movement vector o the movement vector.

5. The image blur correction apparatus according to claim 3, wherein the calculating unit adds the position information converted into pixel units using a focal length of the imaging optical system or a frame rate of an image to the movement vector.

6. The image blur correction apparatus according to claim 3, wherein the control unit includes:
   a first control unit configured to control the correction unit using an amount of correction calculated from a detection signal from the first detection unit; and
   a second control unit configured to control the correction unit by calculating angular velocity data of the object with respect to the image blur correction apparatus and calculating an amount of correction for the image blur of the object.

7. The image blur correction apparatus according to claim 6, wherein the second control unit calculates the angular velocity data of the object using a focal length of the imaging optical system, a frame rate, and a pixel pitch in an imaging element.

8. The image blur correction apparatus according to claim 1, wherein the correction unit includes a correction lens configured to correct an image blur by changing an imaging position of light from the object.

9. An imaging apparatus, comprising:
   a memory;
   at least one processor configured to perform a following function in accordance with a program stored in the memory;
   an imaging unit;
   a first acquiring unit configured to acquire distance information associated with a captured image;
   a second acquiring unit configured to acquire position information of a correction unit;

a calculating unit configured to calculate an amount of movement of an object from a detection signal of shaking detected by a first detection unit, movement information in an image detected by a second detection unit, the distance information, and the position information; and a control unit configured to calculate an amount of correction for the image blur of the object using the amount of movement of the object to control the correction unit configured to optically correct the image blur of the object, wherein the calculating unit calculates the amount of movement of the object by adding the position information synchronized with a detection period of the second detection unit to the movement information.

10. The imaging apparatus according to claim 9, comprising:

a setting unit configured to set a mode for supporting panning, wherein the control unit includes:

a first control unit configured to control the correction unit by an amount of correction calculated from a detection signal from the first detection unit: and a second control unit configured to control the correction unit by calculating angular velocity data of the object with respect to the imaging apparatus and calculating an amount of correction for the image blur of the object, the first detection unit detects an angular velocity of shaking, the second detection unit detects a movement vector from an image having a different imaging time, the calculating unit calculates the amount of movement of the object by adding the position information synchronized with a detection period of the second detection unit and the movement information, and the second control unit controls the correction unit when a mode for supporting the panning is set and the first control unit controls the correction unit when the mode is not set.

11. A control method performed by an image blur correction apparatus which optically corrects an image blur of an object in an image captured by an imaging unit through an imaging optical system using a correction unit, comprising:

acquiring distance information associated with the captured image and position information of the correction unit;

performing calculation processing for an amount of movement of the object from a detection signal of shaking detected by a first detection unit, movement information in an image detected by a second detection unit, the distance information, and the position information; and controlling the correction unit by calculating an amount of correction for correcting the image blur of the object using the amount of movement of the object;

wherein, in the calculation processing, the amount of movement of the object is calculated by adding the position information synchronized with a detection period of the second detection unit to the movement information.

12. The control method of the image blur correction apparatus according to claim 11, wherein the distance information is acquired using a detection signal from a phase difference detection unit for autofocus, an evaluation value of a contrast of an image signal from the imaging unit, or an image signal from an image plane phase difference type imaging element.

13. The control method of the image blur correction apparatus according to claim 11, wherein the first detection unit detects an angular velocity of shaking, and the second detection unit detects a movement vector from an image having a different imaging time.

14. The control method of the image blur correction apparatus according to claim 13, wherein the calculation processing includes: adding an average value of pieces of position information from the second acquiring unit synchronized with a detection period of the movement vector to the movement vector.

15. The control method of the image blur correction apparatus according to claim 13, wherein the calculation processing includes: adding the position information converted into pixel units using a focal length of the imaging optical system or a frame rate of an image to the movement vector.

16. The control method of the image blur correction apparatus according to claim 13, wherein the controlling includes:

a first control step of controlling the correction unit using an amount of correction calculated from a detection signal from the first detection unit; and a second control step of controlling the correction unit by calculating angular velocity data of the object with respect to the image blur correction apparatus and calculating an amount of correction for the image blur of the object.

17. The control method of the image blur correction apparatus according to claim 16, wherein the second control step includes: calculating the angular velocity data of the object using a focal length of the imaging optical system, a frame rate, and a pixel pitch in an imaging element.

18. The control method of the image blur correction apparatus according to claim 11, wherein the correction unit includes: a correction lens configured to correct an image blur by changing an imaging position of light from the object.

* * * * *